(12) United States Patent
Nakai et al.

(10) Patent No.: US 12,241,819 B2
(45) Date of Patent: Mar. 4, 2025

(54) SAMPLE PREPROCESSOR AND ANALYSIS SYSTEM

(71) Applicant: HORIBA Advanced Techno, Co., Ltd., Kyoto (JP)

(72) Inventors: Yoko Nakai, Kyoto (JP); Hiroshi Iida, Kyoto (JP); Kazuya Nakagawa, Kyoto (JP)

(73) Assignee: HORIBA Advanced Techno, Co., Ltd., Kyoto (JP)

( * ) Notice: Subject to any disclaimer, the term of this patent is extended or adjusted under 35 U.S.C. 154(b) by 865 days.

(21) Appl. No.: 17/269,755

(22) PCT Filed: Aug. 9, 2019

(86) PCT No.: PCT/JP2019/031594
§ 371 (c)(1),
(2) Date: Feb. 19, 2021

(87) PCT Pub. No.: WO2020/045053
PCT Pub. Date: Mar. 5, 2020

(65) Prior Publication Data
US 2021/0302289 A1 Sep. 30, 2021

(30) Foreign Application Priority Data
Aug. 31, 2018 (JP) .................................. 2018-162577

(51) Int. Cl.
*G01N 1/40* (2006.01)
(52) U.S. Cl.
CPC ... *G01N 1/4077* (2013.01); *G01N 2001/4088* (2013.01)
(58) Field of Classification Search
CPC ..................... G01N 1/4077; G01N 2001/4088
(Continued)

(56) References Cited

U.S. PATENT DOCUMENTS

| 2008/0131961 A1* | 6/2008 | Crees ..................... C12M 99/00 435/309.1 |
| 2012/0329081 A1* | 12/2012 | Bennion ............... B01L 3/5023 435/8 |

(Continued)

FOREIGN PATENT DOCUMENTS

| CN | 108459120 A | 8/2018 |
| EP | 2523739 | 11/2012 |

(Continued)

OTHER PUBLICATIONS

JP2006212028A machine English Translation (Year: 2006).*
(Continued)

*Primary Examiner* — Michael L Hobbs
*Assistant Examiner* — Lenora A Abel
(74) *Attorney, Agent, or Firm* — Alleman Hall & Tuttle LLP (57) ABSTRACT

To provide a sample preprocessor that can make the amount of a sample liquid after filtering accurate and raise the accuracy of subsequent measurement or the like, the sample preprocessor, where a sample liquid is filtered to capture a predetermined component on a filter, includes a connection mechanism that connects a sample container and a suction source. The sample container includes a bottle that stores a sample liquid and a cartridge that has a tubular shape, has a proximal end side attached to the bottle and, has the filter provided therein. The connection mechanism includes a suction terminal that connects a distal end side of the cartridge and the suction source and sucks the sample liquid in the sample container, and an attachment surface that the bottle is attached to and arranges the cartridge in a predetermined position relative to the suction terminal.

8 Claims, 8 Drawing Sheets

(58) Field of Classification Search
USPC .................................................... 435/309.1
See application file for complete search history.

(56) References Cited

U.S. PATENT DOCUMENTS

| | | | |
|---|---|---|---|
| 2015/0132755 A1 | 5/2015 | Kirschhoffer et al. | |
| 2018/0051313 A1 | 2/2018 | Rajagopal et al. | |

FOREIGN PATENT DOCUMENTS

| | | | | |
|---|---|---|---|---|
| JP | H0344554 A | | 2/1991 | |
| JP | 2003299912 A | | 10/2003 | |
| JP | 2005062084 A | | 3/2005 | |
| JP | 2005278436 A | | 10/2005 | |
| JP | 2006006258 A | | 1/2006 | |
| JP | 2006133232 A | | 5/2006 | |
| JP | 2006212028 A | * | 8/2006 | ............ B01D 61/18 |
| JP | 2006234607 A | | 9/2006 | |
| JP | 2010094136 A | | 4/2010 | |
| JP | 2010194508 A | | 9/2010 | |
| JP | 2011085562 A | | 4/2011 | |
| JP | 2011169886 A | | 9/2011 | |
| JP | 2013000107 A | | 1/2013 | |
| JP | 2013519521 A | | 5/2013 | |
| JP | 2015195784 A | | 11/2015 | |
| JP | 2015533492 A | | 11/2015 | |
| JP | 2019074344 A | | 5/2019 | |
| WO | 2011102816 A1 | | 8/2011 | |
| WO | 2014047770 A1 | | 4/2014 | |
| WO | 2014081877 A1 | | 5/2014 | |
| WO | 2017099357 A1 | | 6/2017 | |

OTHER PUBLICATIONS

China National Intellectual Property Administration, Office Action and Search Report Issued in Application No. 201980053907.5, Jul. 26, 2023, 16 pages.
European Patent Office, Extended European Search Report Issued in Application No. 19853455.4, May 2, 2022, Germany, 8 pages.
ISA Japan Patent Office, International Search Report Issued in International Application No. PCT/JP2019/031594, Nov. 5, 2019, WIPO, 4 pages.
Japan Patent Office, Decisions to Grant Issued in Application No. 2020-540230, Jan. 30, 2023, 5 pages.
China National Intellectual Property Administration, Office Action and Search Report Issued in Application No. 201980053907.5, Jun. 4, 2024, 19 pages.

* cited by examiner

SAMPLE PREPROCESSOR AND ANALYSIS SYSTEM

TECHNICAL FIELD

The present invention relates to a sample preprocessor in which a sample liquid is filtered to capture a predetermined component on a filter.

BACKGROUND ART

When the amount of ATP (adenosine triphosphate) or the amount of a microorganism existing is measured for example, preprocessing is performed in which a sample liquid is filtered with a filter to enhance the concentration of a predetermined component in the sample liquid.

In such preprocessing, a sample container, which includes a filter therein and stores a sample liquid, and a sample preprocessor, which the sample container is connected to and performs suction so that the sample liquid in the sample container passes through the filter to be filtered, are used. The filtering enables the sample liquid to be concentrated in the sample container.

Incidentally, in measurement for detection of ATP or a microorganism, and the like, large measurement deviation can occur even when deviation in the amount of the sample liquid is very small.

In addition, a sample container in which a sample liquid differing from filtering to filtering is accommodated is connected to a suction terminal, and thus, ATP or a microorganism that adhered to the suction terminal at the previous filtering can contaminate the sample container currently attached. To achieve ATP measurement or microorganism detection with higher accuracy, prevention of such contamination has been desired.

CITATION LIST

Patent Literature

PTL 1: Japanese Unexamined Patent Application Publication No. 2006-133232

SUMMARY OF INVENTION

Technical Problem

The present invention has been made in view of the above-described problem and is aimed at providing a sample preprocessor that can make the amount of the sample liquid after filtering accurate and raise the accuracy of subsequent measurement or the like.

Solution to Problem

That is, a sample preprocessor according to the present invention, where a sample liquid is filtered to capture a predetermined component on a filter, includes a connection mechanism that connects a sample container and a suction source, the sample container including a bottle that stores a sample liquid and a cartridge that has a tubular shape, has a proximal end side attached to the bottle and, has the filter provided therein, the connection mechanism including a suction terminal that connects a distal end side of the cartridge and the suction source and sucks the sample liquid in the sample container, and an attachment surface that the bottle is attached to and arranges the cartridge in a predetermined position relative to the suction terminal.

In such a sample preprocessor, the cartridge can be arranged in a constantly identical position relative to the suction terminal simply by attaching the bottle to the attachment surface. Accordingly, the positional accuracy of the cartridge in the suction of the sample liquid can be raised only through a simple attachment operation and the amount of the sample liquid in the cartridge can be measured accurately simply by detecting the level of the liquid surface in the cartridge.

As a specific configuration for facilitating enhancement of the positional accuracy of the cartridge in the suction while simplifying effort in attaching the sample container to the connection mechanism, the sample preprocessor can be named, in which the connection mechanism includes a terminal plate where the suction terminal is provided, and a positioning stage that is secured in a position at a predetermined distance from the terminal plate and on which the attachment surface is formed, and the positioning stage includes an insertion hole formed in a position opposite the suction terminal, the cartridge being inserted into the insertion hole.

To facilitate a sterilization process or the like performed on the suction terminal that is in direct contact with the cartridge and can cause contamination while inhibiting change in the positional relationship between the attachment surface and the suction terminal even an operation such as the sterilization process is performed, it is just needed that a main body that includes the suction source and a mount surface on which the connection mechanism is mounted be included and the connection mechanism be structured so as to be detachable from the laying surface.

For example, if only the suction terminal can be attached to and detached from the main body, the suction terminal can be attached to a different position from the initial position when attached to the main body again after the sterilization process or the like. Such attachment deviation can cause variation in the positional relationship between the cartridge and the suction terminal. In contrast, if the entire connection mechanism is attachable and detachable as described above, the positional relationship between the attachment surface and the connection terminal can be maintained and thus, even when the sterilization process or the like is performed, the positional accuracy of the cartridge and the suction terminal can be maintained.

To enable the suction terminal to be connected to the suction source easily after performing the sterilization process on the connection mechanism, it is just needed to further include a suction port that is opened in the mount surface and connected to the suction source by a suction pipe, and a positioning structure that is provided between the connection mechanism and the main body and, in a state in which the connection mechanism is mounted on the mount surface, positions the connection mechanism so that the suction terminal is connected to the suction port.

To decompose ATP remaining on the connection mechanism with an autoclave so as to avoid occurrence of measurement deviation, it is just needed for the connection mechanism to be formed from a material having a heat-resistant temperature that allows an autoclave process.

To enable detection of the liquid level of the sample liquid in the cartridge with high accuracy while enabling further reduction in manufacture cost in comparison with conventional techniques and achieving size reduction, it is just needed to further include a liquid surface sensor that is a reflecting type and detects a liquid surface of the sample liquid in the cartridge, and a sensor holder that secures the liquid surface sensor in relation to the main body so that a liquid surface detection position of the liquid surface sensor is in a position corresponding to a target liquid level.

To enable each filtering of many sample liquids in the separate cartridges to be completed in a short time, the connection mechanism includes a plurality of suction terminals, and the connection mechanism is structured so as to enable a suction operation to be performed concurrently in a state in which the sample container is connected to each of the suction terminals.

To enable the sample preprocessor to detect that connection deficiency is caused between the suction terminal and the suction source and leakage is occurring, and for example, to stop the suction operation, the sample preprocessor can be named, which further includes a reception tray that is provided below the suction pipe and receives a filtrate of a sample liquid that leaks from the suction pipe, and a filtrate detection sensor that detects whether a filtrate is present in the reception tray. As the filtrate detection sensor, a filtrate detection sensor of various schemes can be used, such as an optical scheme, a capacitive scheme, or a resistance detection scheme.

With an analysis system that includes the sample preprocessor according to the present invention, and a sample analyzer whose measurement object is a sample liquid concentrated by the sample preprocessor, for example, the measurement accuracy of ATP measurement, microorganism detection, or the like can be raised in comparison with conventional techniques.

Advantageous Effects of Invention

As described above, in the sample preprocessor according to the present invention, the connection position of the suction terminal and the cartridge can be held in a constantly identical positional relationship simply by attaching the bottle of the sample container to the attachment surface. Accordingly, effort for connection can be reduced and the accuracy of the amount of the sample liquid measured in the cartridge can be raised. Thus, in comparison with conventional techniques, it is possible to further enhance the measurement accuracy of for example, ATP measurement, microorganism detection, or the like to be performed subsequently.

LIST OF REFERENCE CHARACTERS

100 SAMPLE PREPROCESSOR
1 MAIN BODY
11 MOUNT SURFACE
12 SUCTION PORT
13 RECEPTION TRAY
14 FILTRATE DETECTION SENSOR
2 CONNECTION MECHANISM
22 SUCTION TERMINAL
26 ATTACHMENT SURFACE
31 LIQUID SURFACE SENSOR
4 ENGAGEMENT STRUCTURE
41 ENGAGEMENT HOLE
42 POSITIONING PIN
S SAMPLE CONTAINER
S1 BOTTLE
S2 CARTRIDGE
F FILTER

DESCRIPTION OF EMBODIMENTS

An analysis system and a sample preprocessor 100 according to a first embodiment of the present invention are described with reference to FIGS. 1 to 7. In the analysis system of the first embodiment, a sample liquid is concentrated through filtering and the concentrated sample liquid is analyzed about the amount of a predetermined component, such as ATP or a microorganism itself, and the like.

Figure 1:
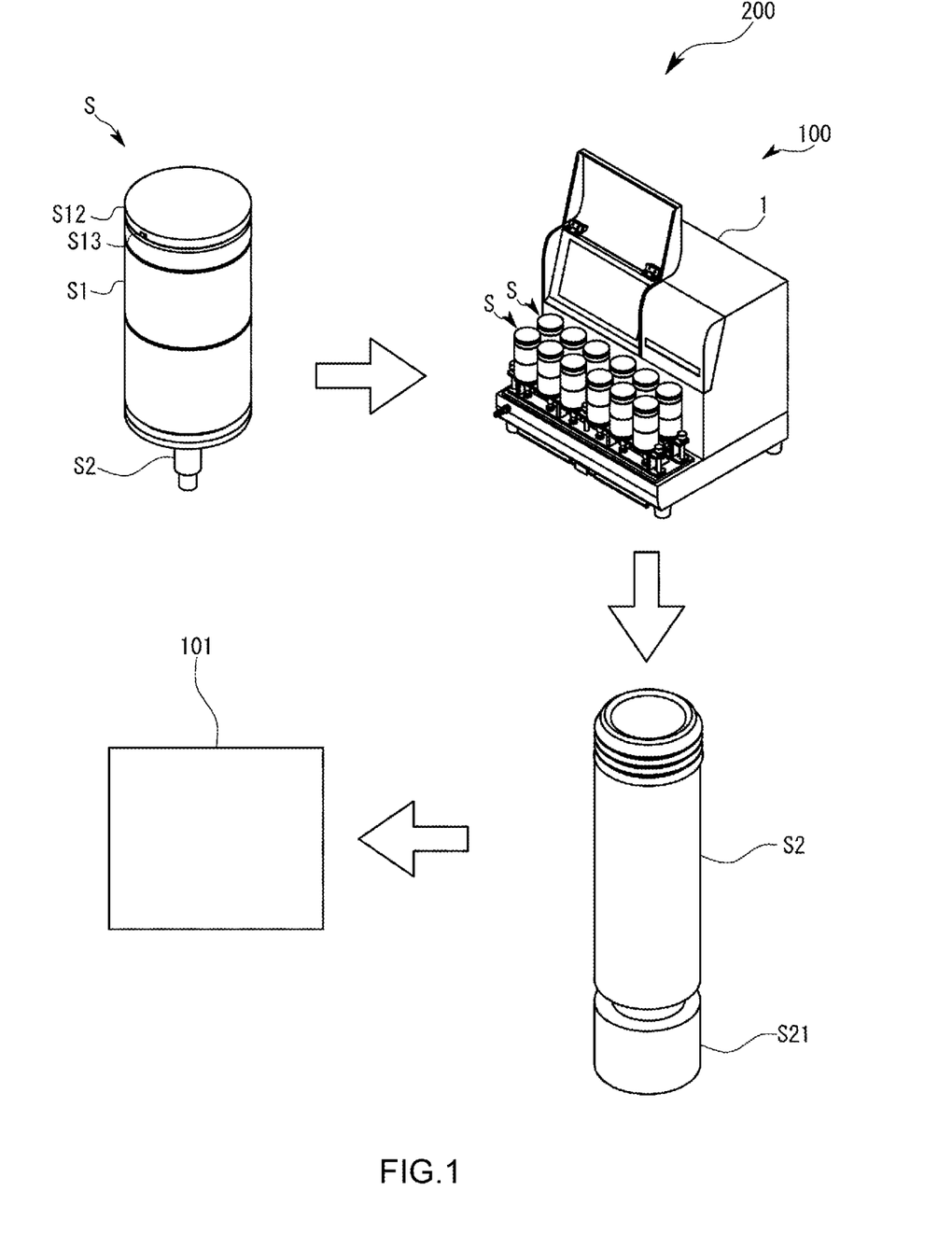
FIG. 1 is a schematic diagram illustrating a sample preprocessor and an analysis system according to a first embodiment of the present invention.
Figure 2:
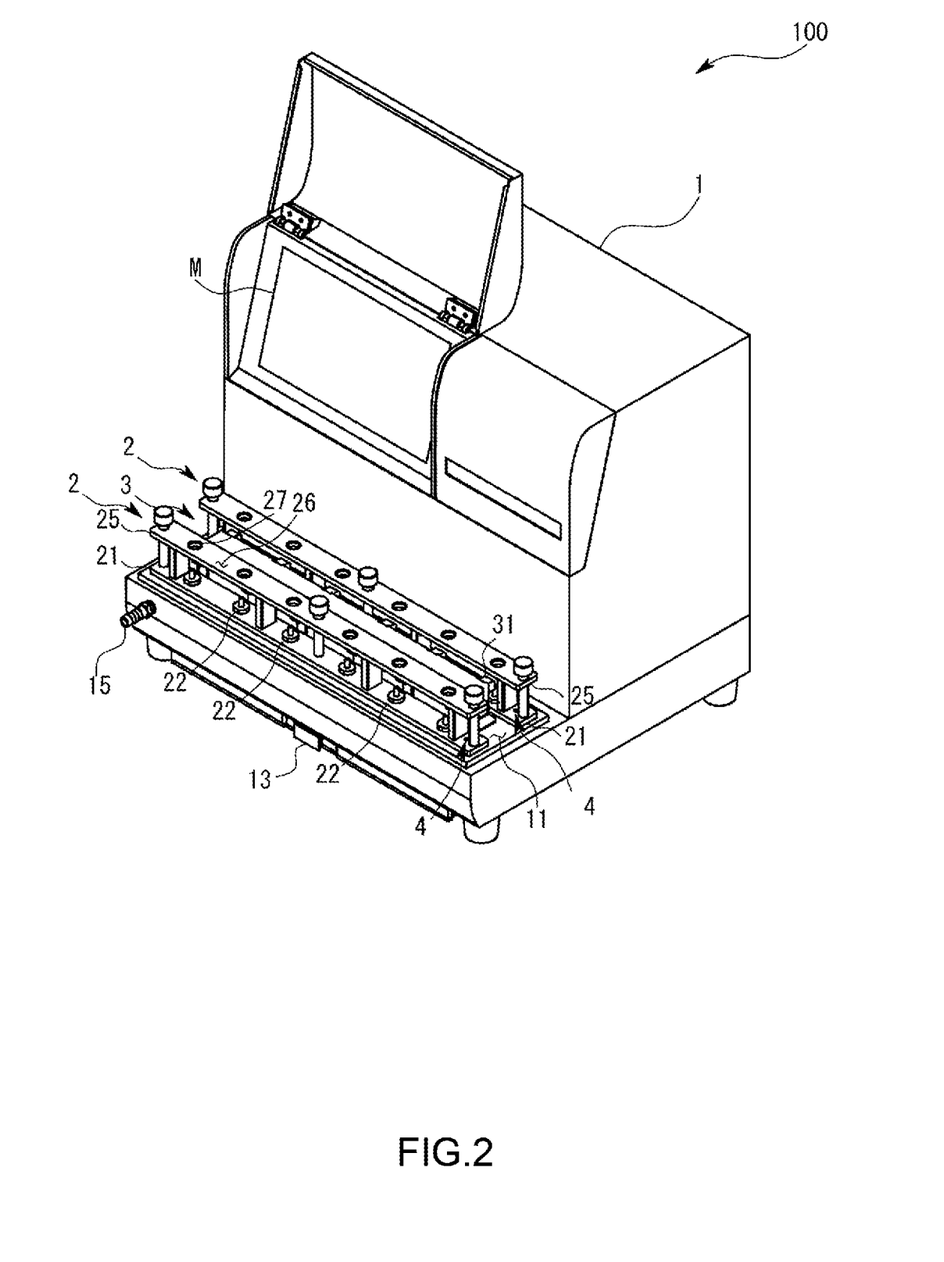
FIG. 2 is a schematic perspective view illustrating the sample preprocessor according to the first embodiment of the present invention.

As illustrated in FIG. 1, the analysis system is made up of a sample container S, in which the sample liquid is accommodated, the sample preprocessor 100, which performs filtering and concentration of the sample liquid, and a sample analyzer 101, whose measurement object is the sample liquid after the concentration.

Figure 6:
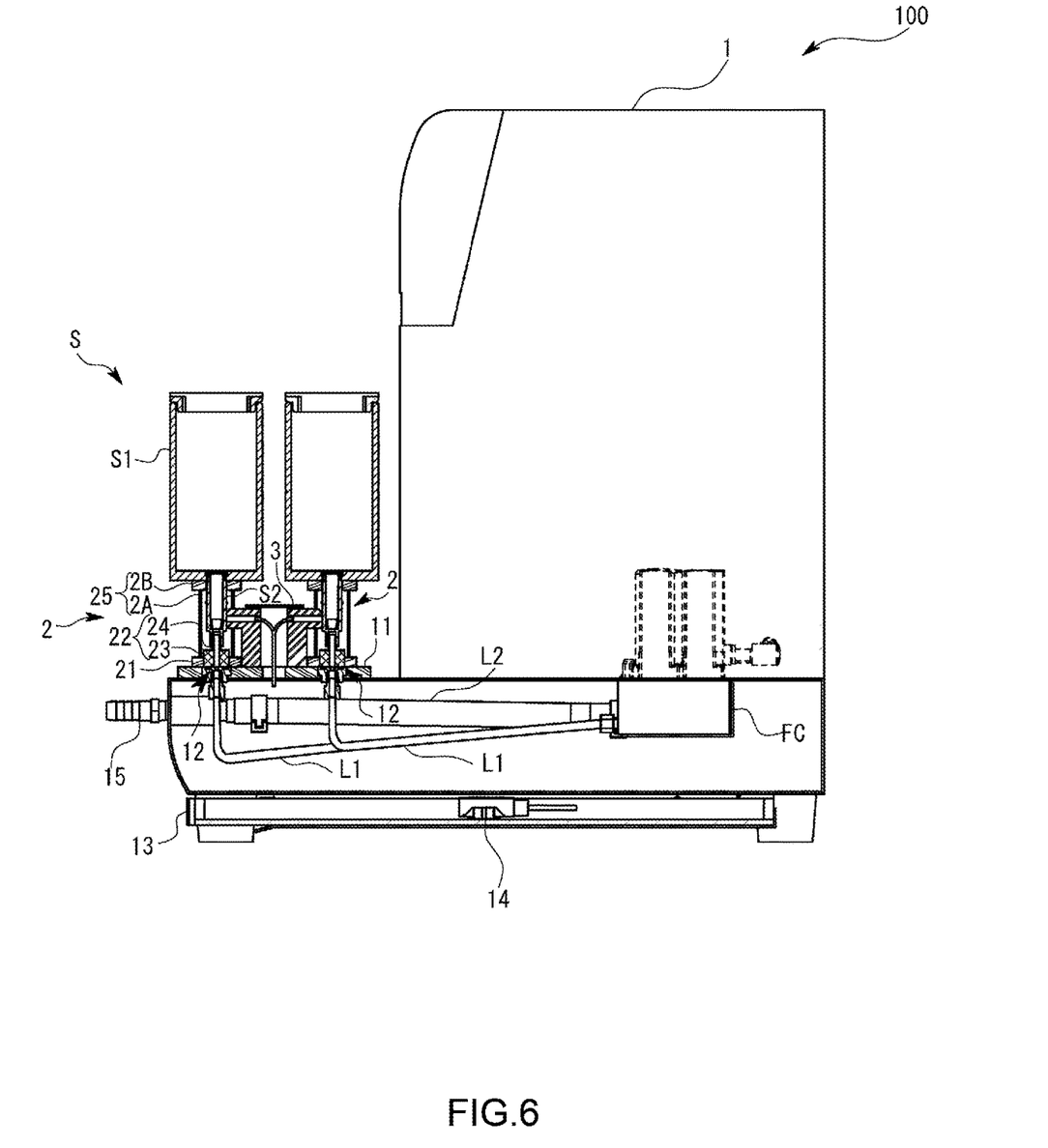
FIG. 6 is a schematic sectional view illustrating the sample preprocessor according to the first embodiment.

As illustrated in FIGS. 1 and 6, the sample container S includes a bottle S1 in which the sample liquid is stored and a cartridge S2 in which a filter F is formed. The cartridge S2 is attached to the bottle S1 in the sample container S so as to be detachable and is a portion that is removed from the bottle S1 after the filtering and concentration process and also used in subsequent measurement in the sample analyzer 101. The sample container S that includes the bottle S1 and the cartridge S2 as illustrated in FIG. 1 is attached to the sample preprocessor 100 in a state in which the upper opening of the bottle S1 is shut with a lid S12 and contamination of the sample liquid by the external factors is prevented, and after that, the sample liquid stored in the bottle S1 of the sample container S is sucked by the sample preprocessor 100. The suction operation causes the most part of the sample liquid in the bottle S1 to be filtered through the filter F in the cartridge S2. Since an air hole S13 for allowing air from the outside to flow into the bottle S1 is formed in a side portion of the lid S12, the atmospheric pressure above the sample liquid can be maintained at almost the same as that in the outside even in the suction operation and a pressure difference necessary for the filtering can be created. A predetermined component in the sample liquid is captured on the filter F and the most part of the liquid component is discarded as a filtrate. On the other hand, part of the liquid component of the sample liquid that has not passed through the filter F is left in the cartridge S2 by a predetermined amount.

After the completion of the filtering by the sample preprocessor 100, the cartridge S2 is removed from the bottle S1 and a cap S21 is attached to a distal end portion of the cartridge S2 so as not to contaminate the filter F by the factors external to the cartridge S2. After that, the cartridge S2 with the cap S21 as a whole is accommodated in the sample analyzer 101 to be used. Further, the concentrated sample liquid in the cartridge S2 is dispensed in the sample analyzer 101 and for example, through addition of a reagent or the like, the amount of ATP or a microorganism is measured.

The details of the sample preprocessor 100 are mainly described below. As illustrated in FIGS. 2 to 4 and FIG. 6, the sample preprocessor 100 includes a main body 1 with a touch panel display M for indicating the control state and the like, which is provided on the front of the main body 1, and a connection mechanism 2, which is mounted over a mount surface 11 located on the front side of the main body 1 and connects the sample container S made up of the bottle S1 in which the sample liquid is stored and the cartridge S2 to a pump in the main body 1.

Figure 4:
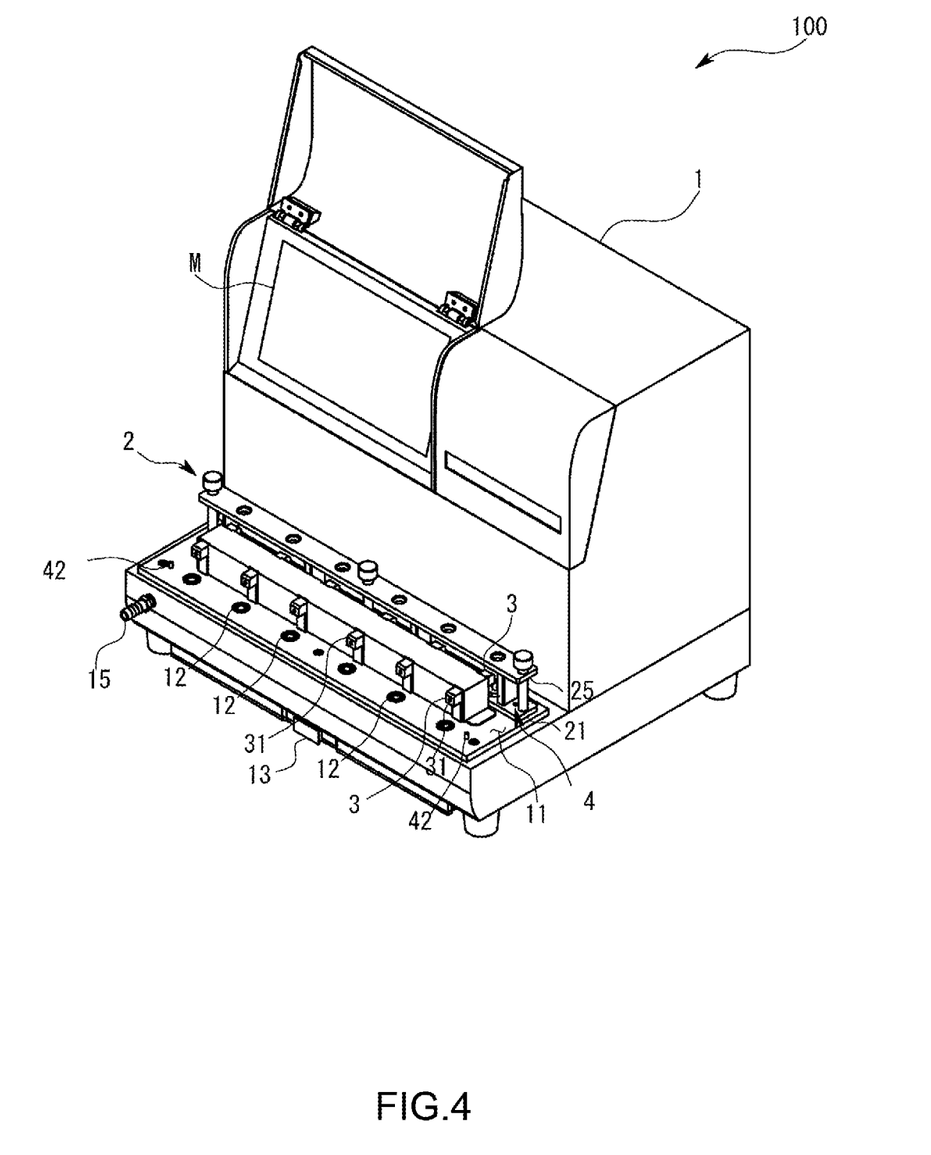
FIG. 4 is a schematic perspective view illustrating a state in which a connection mechanism is removed from the sample preprocessor according to the first embodiment.
Figure 5:
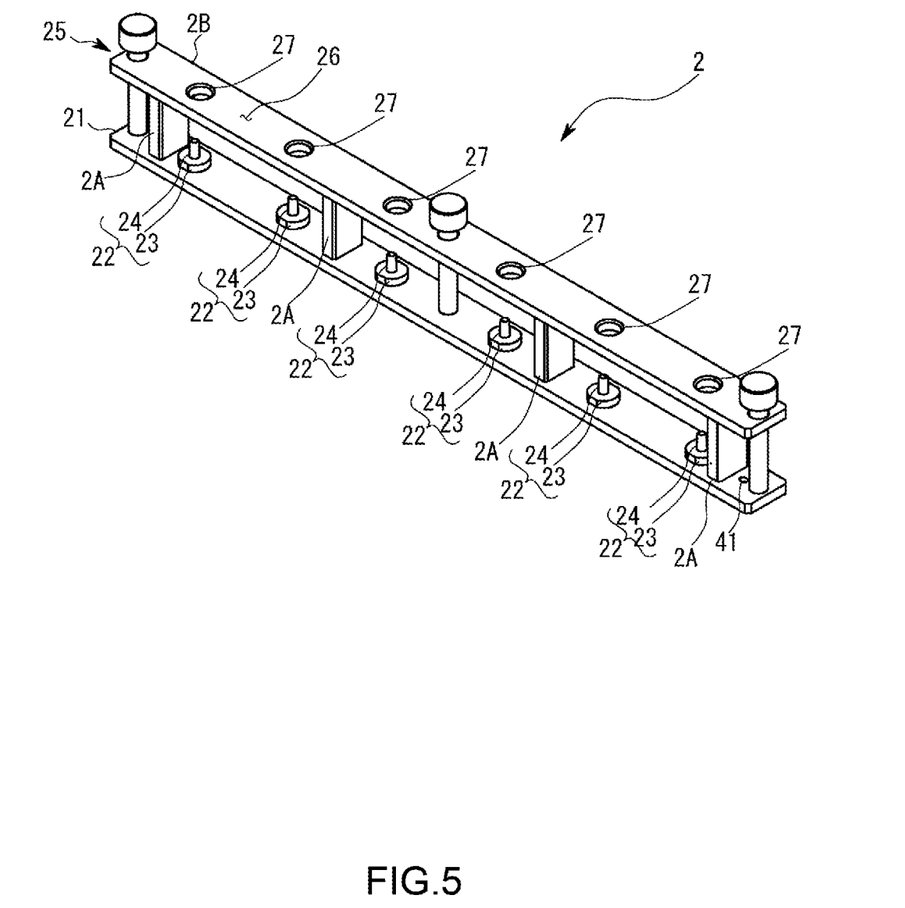
FIG. 5 is a schematic perspective view illustrating the connection mechanism of the sample preprocessor according to the first embodiment, which is in a state of being removed.

On a use end side of the main body 1, the mount surface 11 lying as a horizontal plane is formed and as illustrated in FIGS. 4 and 5, the connection mechanism 2 is structured so as to be attachable to and detachable from the mount surface 11. As illustrated in FIGS. 4 and 5, a suction port 12 connected to the pump as an unillustrated suction source by a connection pipe L1 is opened in the mount surface 11 and a suction terminal 22 provided in the connection mechanism 2 is connected to the suction port 12.

As illustrated in the sectional view in FIG. 5, the filtrate obtained by the filtering in the cartridge S2 passes through the connection pipe L1 in the main body 1 to reach a fluid control mechanism FC and passes from the fluid control mechanism FC through a filtrate discharge pipe L2 to be discharged outside finally from a filtrate discharge terminal 15 that projects on the use end side of the main body 1. A waste fluid tank and the pump, which are not illustrated, are connected to the filtrate discharge terminal 15. The fluid control mechanism FC is made up of a plurality of valves and the like and performs switching for the suction port 12 that is to be involved in the suction operation.

A reception tray 13 is provided below the connection pipe L1 and the filtrate discharge pipe L2 so as to receive the filtrate in case of its leakage. Further, a filtrate detection sensor 14 of an optical scheme for example, which is attached so that its sensor surface faces toward the bottom surface side is provided on the reception tray 13. When the filtrate detection sensor 14 detects the filtrate, the state turns a lock state, in which the operation of the pump is stopped by an unillustrated control mechanism.

As illustrated in FIGS. 2 to 7, over the mount surface 11, not only the connection mechanism 2 but also a sensor holder 3 is secured, which holds a liquid surface sensor 31 that detects the liquid surface in the cartridge S2 of the sample container S attached to the connection mechanism 2.

The detailed structures of the sample container S, the connection mechanism 2, and the sensor holder 3 are described below.

Figure 7:
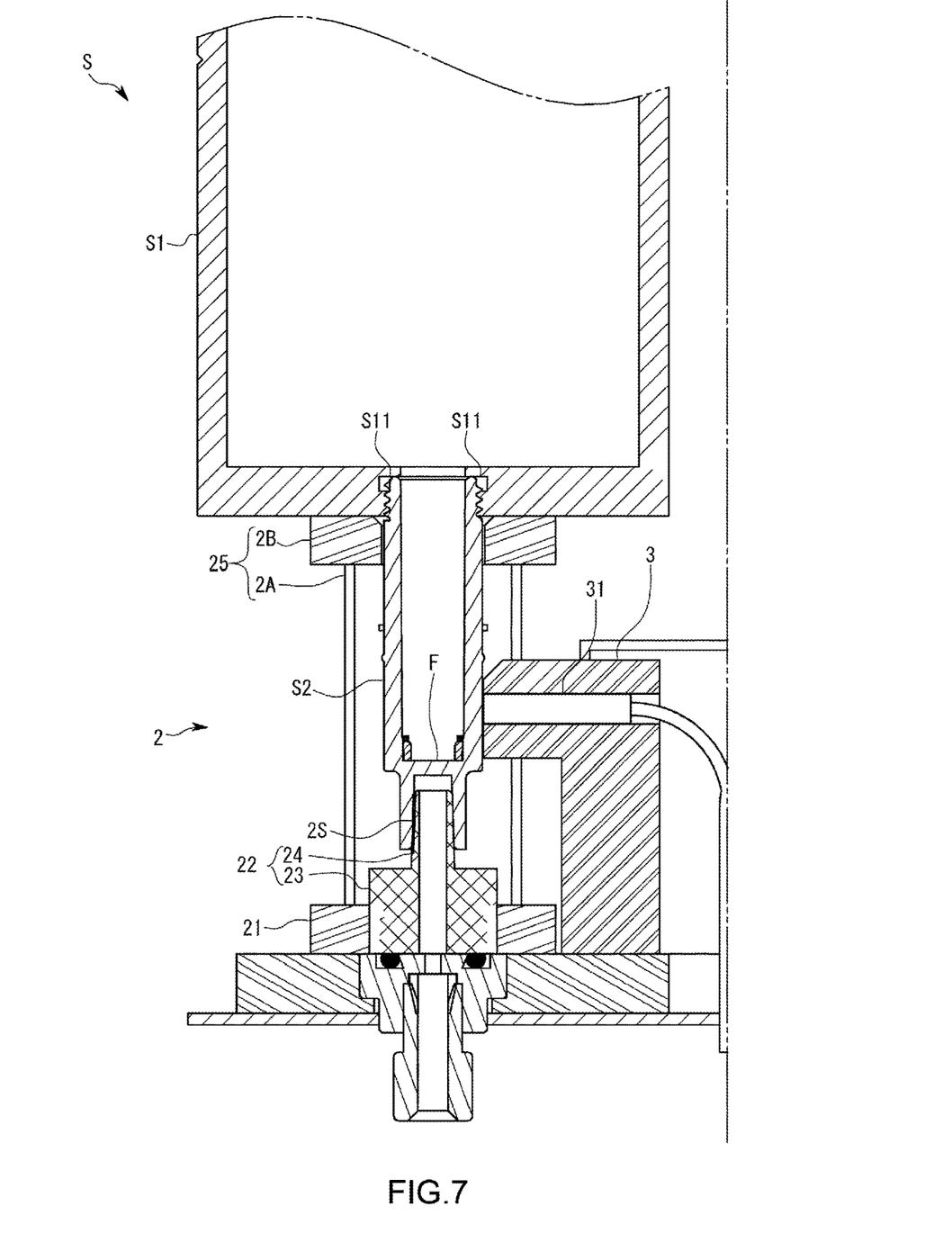
FIG. 7 is a schematic partial sectional view illustrating the periphery of the connection mechanism of the sample preprocessor according to the first embodiment through enlargement.

As illustrated in FIGS. 1, 6, and 7, the sample container S is made up of the bottle S1, which stores the sample liquid and is approximately cylindrical, and the cartridge S2, which is smaller than the bottle S1 in diameter and capacity and shaped like a narrow tube while including the filter F provided in its inner central portion. In the sample container S, the center of a bottom surface portion of the bottle S1 and a proximal end side of the cartridge S2 are screwed to each other with a screw and secured in a state in which part of the cartridge S2 on the proximal end side intrudes into the bottom surface portion of the bottle S1. The positional relationship between the bottle S1 and the cartridge S2 is not limited to this example but for example, the cartridge S2 may be screwed on the outer periphery side of the bottom surface portion of the bottle S1. As illustrated in FIG. 7, an abutting surface S11 is formed at the bottom surface of the bottle S1. The abutting surface S11 abuts on the proximal end surface of the cartridge S2 and prevents further intrusion of the cartridge S2 into the bottle S1. Accordingly, the longitudinal dimension of the cartridge S2 projecting from the bottom surface portion of the bottle S1 in a state in which the cartridge S2 is screwed to the bottle S1 sufficiently is approximately fixed. In other words, the abutting surface S11 formed at the bottom surface of the bottle S1 positions the cartridge S2 in relation to the bottle S1. Further, in a state in which the cartridge S2 is screwed to the bottle S1, the bottom surface of the bottle S1 extends beyond the outer periphery side of the cartridge S2 and forms a shoulder portion of the sample container S.

Figure 3:
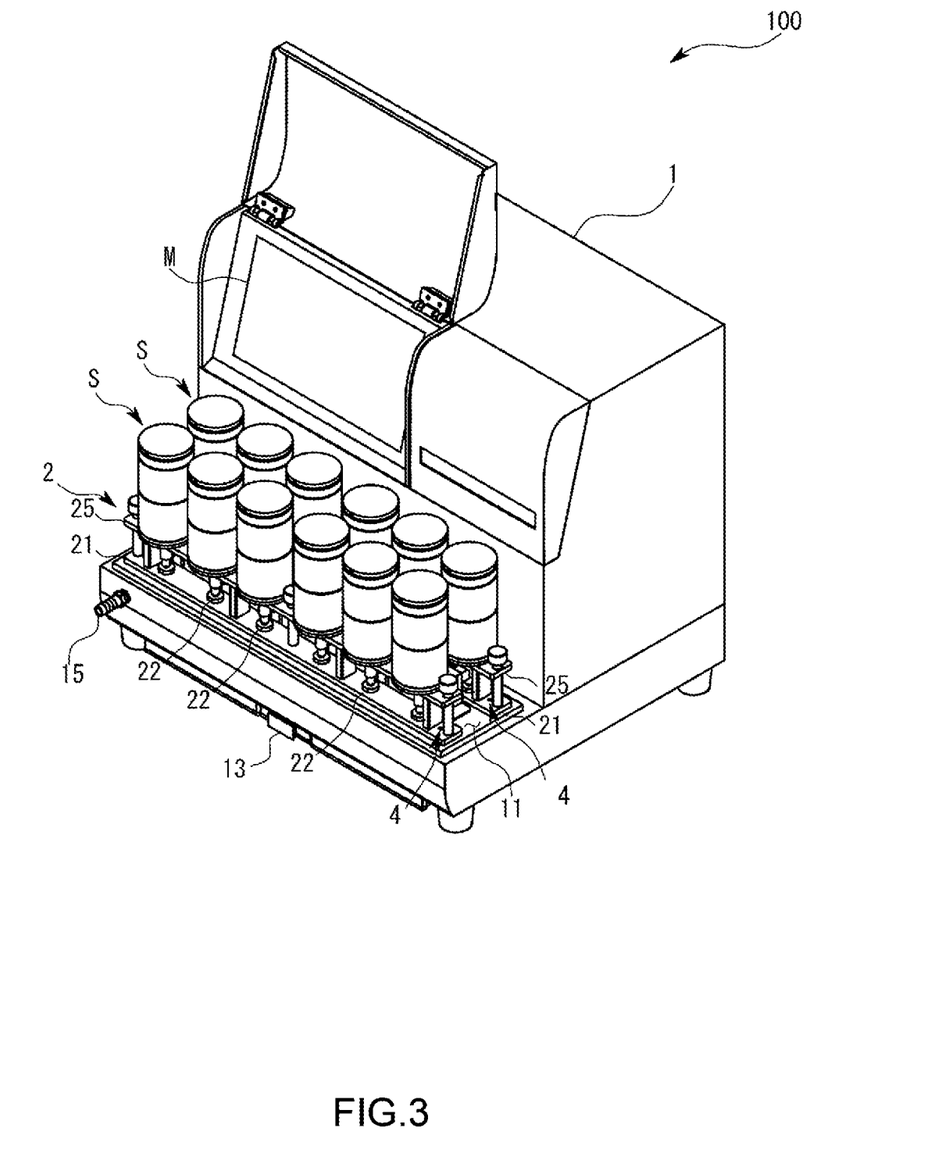
FIG. 3 is a schematic perspective view illustrating a state in which a sample container is connected to the sample preprocessor according to the first embodiment.

As illustrated in FIG. 3, the connection mechanism 2 is structured so as to allow the plurality of sample containers S to be aligned and attached thereon. As illustrated in FIG. 5, the connection mechanism 2 includes a terminal plate 21, on which the plurality of suction terminals 22 to which the distal end portions of the cartridges S2 are attached are provided, and a positioning stage 25, which forms an attachment surface 26 for the bottom surface of the bottle S1 in a position at a predetermined distance from the terminal plate 21.

The terminal plate 21 is shaped like a long plate and in the first embodiment, the six suction terminals 22 are aligned thereon. As illustrated in the sectional views in FIGS. 6 and 7, the suction terminal 22 includes a wide cylindrical portion 23, which is connected to the suction port 12 opened on the mount surface 11, and a narrow cylindrical portion 24, which projects from the wide cylindrical portion 23 and is fit in the distal end portion of the cartridge S2. The suction terminal 22 is structured such that part of the wide cylindrical portion 23 is embedded in the terminal plate 21 and the narrow cylindrical portion 24 projects to the outside of the terminal plate 21. Further, as illustrated in FIG. 7, a linear groove 2S, which extends in a generating line direction, is formed on the outer surface of the distal end portion of the narrow cylindrical portion 24 inserted in the cartridge S2. After the suction operation for the sample container S ends, outside air flows into the suction terminal 22 and the suction port 12 through a gap between the groove 2S and the inner peripheral surface of the cartridge S2. Accordingly, the filtrate that has remained in the suction terminal 22 and the suction port 12 can be caused to flow to the side of the connection pipe L1. Thus, the sucked filtrate can be prevented from returning toward the cartridge S2 side when the distal end of the cartridge S2 is withdrawn from the suction terminal 22.

Moreover, a positioning structure 4, which positions the connection mechanism 2 in a face plate direction on the mount surface 11, is formed between the terminal plate 21 and the mount surface 11. In the first embodiment, the positioning structure 4 is made up of two engagement holes 41, which are provided in the terminal plate 21, and two positioning pins 42, which project over the mount surface 11. Each suction terminal 22 is enabled to communicate with each suction port 12 and press against an O ring provided around the suction port 12 to bring sealing by engaging the positioning pins 42 in the engagement holes 41 and securing the connection mechanism 2 to the mount surface 11 with securing screws. In addition, the positioning structure 4 can arrange the connection mechanism 2 not only in the alignment direction of the suction ports 12 but also in the depth direction perpendicular thereto. Thus, the distance from the plurality of liquid surface sensors 31, which are described later and arranged in a central portion of the mount surface 11, can be kept fixed.

As illustrated in FIG. 5, the positioning stage 25 includes a plurality of columns 2A, which are provided so as to stand in relation to the terminal plate 21, and an attachment plate 2B, which is provided over the columns 2A. As illustrated in FIGS. 6 and 7, the upper surface side of the attachment plate 2B forms the attachment surface 26 on which the shoulder portion of the sample container S, that is, the bottom surface of the bottle S1 is laid. The attachment surface 26 is structured so as to be parallel to the face plate portion of the terminal plate 21 and an imaginary plane made by the respective distal ends of the narrow cylindrical portions 24 of the suction terminals 22. In the attachment plate 2B, insertion holes 27, which allow only portions of the sample containers S that are for the cartridges S2 to be inserted toward the terminal plate 21 side, are formed in positions corresponding to the suction terminals 22. Further, the inside diameter of the insertion hole 27 is caused to have almost the same dimension as the outside diameter of the cartridge S2 so that the cartridge S2 can be inserted straight. Thus, simply by laying the sample container S over the positioning stage 25, the distal end portion of the cartridge S2 can be inserted easily toward the narrow cylindrical portion 24 of the suction terminal 22. Accordingly, as illustrated in FIGS. 3, 6, and 7, simply by laying the shoulder portion of the sample container S over the attachment surface 26 of the positioning stage 25, the narrow cylindrical portion 24 of the suction terminal 22 is allowed to be inserted in the distal end portion of the cartridge S2 and the length of the insertion can be made fixed. Thus, simply by attaching the sample container S to the attachment surface 26, the positional relationship between the suction terminal 22 and the cartridge S2 can be kept fixed constantly.

In addition, the columns 2A of the positioning stage 25 are secured to the terminal plate 21 by being screwed and thus, as illustrated in FIGS. 3 and 4, the connection mechanism 2 can be removed from the main body 1 while the stage for the terminals and the positioning stage 25 remain integral. Accordingly, even when the connection mechanism 2 is attached to or detached from the main body 1, the positional relationship between the suction terminal 22 and the attachment surface 26 remain unchanged. Moreover, the stage for the terminals, the suction terminals 22, and the positioning stage 25 that make up the connection mechanism 2 are each formed from a metal material only for example, and therefore, occurrence of deformation can be hindered even if the temperature rises through an autoclave process. Thus, even when removal of the remaining ATP or a sterilization process for a microorganism is performed through the autoclave process on the suction terminal 22 that is in direct contact with the cartridge S2, occurrence of change in the positional relationship between the suction terminal 22 and the attachment surface 26 can be hindered. The connection mechanism 2 is not limited to what is formed from a metal material only but, for example, may be formed from a resin material, such as PEEK, so as to be resistant to the autoclave process.

As illustrated in FIGS. 4, 6, and 7, the sensor holder 3 secures and holds the liquid surface sensor 31 in a position corresponding to each suction terminal 22. In the first embodiment, the sensor holder 3 is secured to the mount surface 11 and basically, is not removed. As illustrated in FIG. 7, the liquid surface sensor 31 is a reflecting sensor, which detects the presence of a liquid surface by letting light enter from the side surface of the cartridge S2 and detecting the reflected light thereof. Because of the sensor holder 3, the liquid surface sensor 31 is arranged such that the sensor surface abuts on the side surface of the cartridge S2 or a slight gap is formed therebetween. Since the liquid surface sensor 31 is arranged as described above, the liquid surface in the cartridge S2 can be detected with high accuracy even when it is a reflecting type. The liquid surface sensor 31 can abut onto the side surface of the cartridge S2 because the positioning structure 4 positions the connection mechanism 2 in its shorter-dimension direction with high accuracy. Thus, the position of the liquid surface sensor 31 is secured by the sensor holder 3 and the positions of the cartridge S2 and the suction terminal 22 and the positions of the side surface of the cartridge S2 and the liquid surface sensor 13 are kept almost fixed by the connection mechanism 2, and as a result, the level of the liquid surface detected by the liquid surface sensor 31 can be kept at an almost fixed location from the distal end of the cartridge S2. Until the liquid surface sensor 31 detects a liquid surface, the pump continues to suck the sample liquid from the inside of the bottle S1 into the cartridge S2. Accordingly, at the timing at which the suction by the pump ends, a predetermined amount of the sample liquid remains on the filter F in the cartridge S2.

The amount of the sample liquid left in the cartridge S2 at the timing at which the filtering ends may be made adjustable as desired by making the level of the sensor holder 3 or the liquid surface sensor 31 relative to the mount surface 11 changeable. For example, the sensor holder 3 may be structured so that the level of the liquid surface sensor 31 can be changed by stages among a plurality of levels that are determined in advance.

In the thus structured sample preprocessor 100 according to the first embodiment, as illustrated in FIGS. 4 and 5, the connection mechanism 2 with the suction terminal 22 that comes into direct contact with the sample container S can be attached to and detached from the main body 1 with the pump as the suction source and therefore, the ATP removal process or the sterilization process can be performed in unison on each suction terminal 22 through the autoclave process or the like for example. As a result, the potential to cause contamination at the time of filtering of the sample liquid can be removed.

In addition, the connection mechanism 2 is attached and detached while the positioning stage 25 is secured in relation to the terminal plate 21 and thus, the positional relationship between each suction terminal 22 and the attachment surface 26 is less likely to change even when an attachment and detachment operation for the autoclave process or the like is performed. Accordingly, the amount of the sample liquid in the cartridge S2 measured after the filtering is less likely to deviate and the accuracy of subsequent ATP measurement, subsequent prompt detection of a microorganism, or the like can be raised in comparison with conventional techniques. Moreover, a predetermined amount of the liquid can remain in the cartridge S2 with accuracy simply through the suction operation of the sample preprocessor 100 and thus, it is unnecessary to adjust the amount of the liquid by adding the liquid extra for subsequent measurement as in conventional cases. Consequently, time taken to perform preprocessing for measurement can be shortened and the possibility of contamination caused by the addition of the liquid can be eliminated.

Further, the suction terminal 22 and the cartridge S2 can be connected only by inserting the cartridge S2 into the insertion hole 27 and laying the bottom surface of the bottle S1 onto the attachment surface 26 in the sample container S. Accordingly, through a simpler connection operation than conventional connection operations, the positional accuracy of the suction terminal 22 and the cartridge S2 can be made high.

In addition, the plurality of suction terminals 22 are provided on the connection mechanism 2 and the suction operation can be performed on the sample containers S in a plurality of lines concurrently while shortening the operation time.

Other embodiments of the present invention are described.

Although in the first embodiment, the plurality of suction terminals are provided on the connection mechanism and the filtering of the respective sample liquids accommodated in the plurality of sample containers can be performed concurrently, only a single suction terminal may be provided on the connection mechanism.

The mount surface to which the connection mechanism is attached is not limited to a horizontal surface but may be formed as, for example, a vertical surface. That is, the sample containers may be attached along a horizontal direction instead of being attached along a vertical direction.

Figure 8:
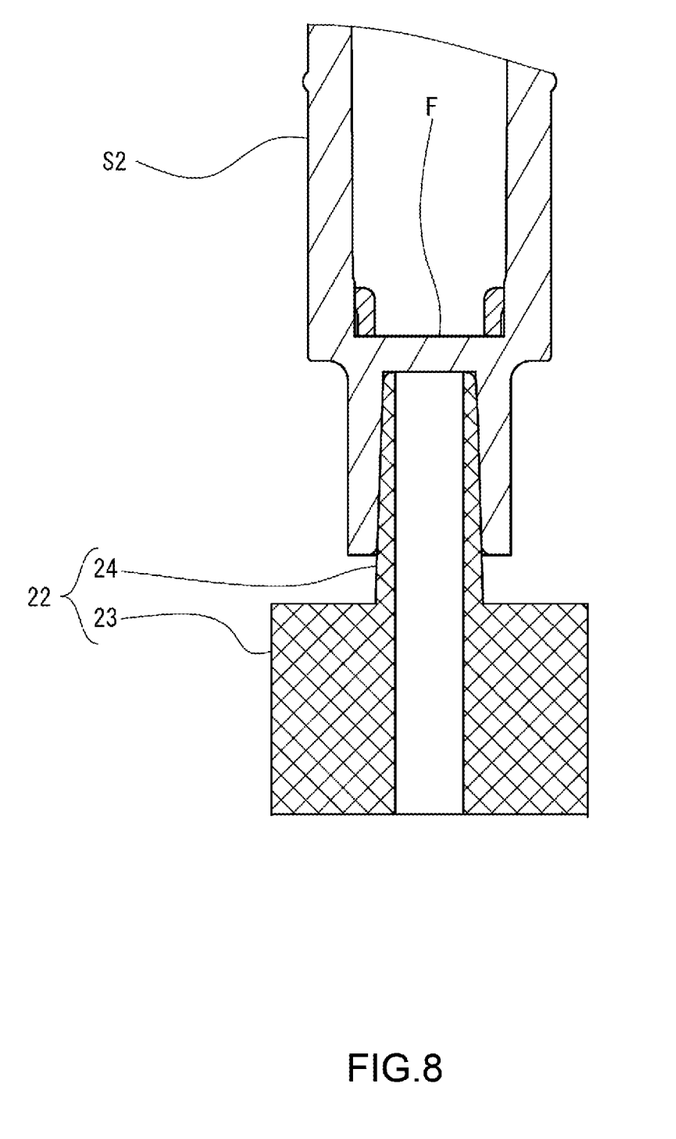
FIG. 8 is a schematic sectional view illustrating the peripheries of a cartridge and a suction terminal in a variation of the sample preprocessor according to the first embodiment through enlargement.

Although in the first embodiment, the narrow cylindrical portion of the suction terminal is inserted in the distal end portion of the cartridge, this relationship may be opposite. That is, the distal end portion of the cartridge may be inserted in the narrow cylindrical portion. In addition, as illustrated in the partially enlarged view in FIG. 8, the filtering may be performed in a state in which the distal end portion of the narrow cylindrical portion 24 of the suction terminal 2 is fit in the distal end portion of the cartridge S2 and the distal end of the narrow cylindrical portion 24 is in close contact with the filter F provided in the cartridge S2. Such a structure can prevent creation of a liquid pool between the cartridge S2 and the narrow cylindrical portion 24. The filtering accuracy can be raised as described above and it can be thus prevented at the time of measurement that, if a liquid pool is present for example, after ATP is taken out from among the microorganisms on the filter F, the ATP molecules will diffuse into the liquid pool through the filter F and the ATP concentration will be smaller than an actual value. The attachment structure of the cartridge relative to the bottle is not limited to the thread structure described in the embodiment. For example, the cartridge may be fit in a hole formed in the bottom surface of the bottle or the bottle and the cartridge may be integrally formed with resin and a rupture structure may be formed such that the boundary portion therebetween can be separated.

Furthermore, combining parts of various embodiments or variations are possible as long as such combination or variations do not violate the gist of the present invention.

INDUSTRIAL APPLICABILITY

The present invention can provide a sample preprocessor that can reduce effort for connection and raise the accuracy of the amount of a sample liquid measured in a cartridge. In addition, the use of such a sample preprocessor can further enhance the measurement accuracy of, for example, ATP measurement, microorganism detection, or the like, which will be performed subsequently, in comparison with conventional techniques.

The invention claimed is:

1. A sample preprocessor where a sample liquid is filtered to capture a predetermined component on a filter and which concentrates the sample liquid, the sample preprocessor comprising:
    a connection mechanism that connects a sample container and a suction source, the sample container including a bottle that stores a sample liquid and a cartridge that has a tubular shape, has a proximal end side attached to the bottle, and has the filter provided therein, wherein
    part of the sample liquid that has been concentrated through filtering is left above the filter of the cartridge and is accommodated in contact with a side wall of the cartridge and a surface of the filter, and
    the connection mechanism includes:
        a suction terminal into which a distal end side of the cartridge is inserted, wherein the suction terminal connects the distal end side of the cartridge and the suction source and sucks the sample liquid in the sample container,
        an attachment surface that the bottle is attached to and arranges the cartridge in a predetermined position relative to the suction terminal,
        a terminal plate where the suction terminal is provided, and
        a positioning stage that is secured in a position at a predetermined distance from the terminal plate and on which the attachment surface is formed,
    the positioning stage includes an insertion hole formed in a position opposite the suction terminal, the cartridge being inserted into the insertion hole,
    an abutting surface abuts on a proximal end surface of the cartridge and prevents further intrusion of the cartridge into the bottle, and
    the cartridge is inserted into the suction terminal through the insertion hole by placing the bottom of the bottle on the attachment surface with a base end face of the cartridge in contact with the abutting surface.

2. The sample preprocessor according to claim 1, further comprising:
    a main body that includes the suction source and a mount surface on which the connection mechanism is mounted, the connection mechanism being structured so as to be detachable from the mount surface.

3. The sample preprocessor according to claim 2, further comprising:
    a suction port that is opened in the mount surface and connected to the suction source by a suction pipe, wherein
    in a state in which the connection mechanism is mounted on the mount surface, the connection mechanism is positioned on the mount surface so that the suction terminal is connected to the suction port.

4. The sample preprocessor according to claim 3, further comprising:
    a reception tray that is provided below the suction pipe and receives a filtrate of a sample liquid that leaks from the suction pipe; and
    a filtrate detection sensor that detects whether a filtrate is present in the reception tray.

5. The sample preprocessor according to claim 2, further comprising:

a liquid surface sensor that is a reflecting sensor and detects a liquid surface of the sample liquid in the cartridge; and a sensor holder that secures the liquid surface sensor in relation to the main body so that a liquid surface detection position of the liquid surface sensor is in a position corresponding to a target liquid level.

6. The sample preprocessor according to claim 1, wherein the connection mechanism is formed from a material having a heat-resistant temperature that allows an autoclave process.

7. The sample preprocessor according to claim 1, wherein the connection mechanism includes a plurality of suction terminals, and the connection mechanism is structured so as to enable a suction operation to be performed concurrently in a state in which the sample container is connected to each of the suction terminals.

8. An analysis system comprising:

the sample preprocessor according to claim 1; and a sample analyzer whose measurement object is a sample liquid concentrated by the sample preprocessor.

* * * * *